(12) United States Patent
Tripathi et al.

US007262559B2

(10) Patent No.: US 7,262,559 B2
(45) Date of Patent: Aug. 28, 2007

(54) LEDS DRIVER

(75) Inventors: Ajay Tripathi, Schaumburg, IL (US); Bernd Clauberg, Schaumburg, IL (US); Young-Kee Min, Elm Grove, WI (US); Raghuram Narasimhan, Lubbock, TX (US); Rohit Khetarpal, Lisle, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 35 days.

(21) Appl. No.: 10/539,981

(22) PCT Filed: Dec. 11, 2003

(86) PCT No.: PCT/IB03/05992

§ 371 (c)(1),
(2), (4) Date: Jun. 19, 2005

(87) PCT Pub. No.: WO2004/057924

PCT Pub. Date: Jul. 8, 2004

(65) Prior Publication Data

US 2006/0071614 A1 Apr. 6, 2006

Related U.S. Application Data

(60) Provisional application No. 60/434,550, filed on Dec. 19, 2002.

(51) Int. Cl.
*H01B 37/02* (2006.01)
(52) U.S. Cl. .................................. 315/291; 315/290 R
(58) Field of Classification Search ............ 315/185 R, 315/291, 209 R
See application file for complete search history.

(56) References Cited

U.S. PATENT DOCUMENTS

| | | | | |
|---|---|---|---|---|
| 4,496,939 A | * | 1/1985 | Moberg | ................. 340/636.13 |
| 6,500,101 B1 | | 12/2002 | Chen | |
| 6,577,072 B2 | * | 6/2003 | Saito et al. | ............. 315/185 R |
| 2002/0158590 A1 | | 10/2002 | Saito et al. | |
| 2004/0032754 A1 | * | 2/2004 | Yang | ....................... 363/56.09 |
| 2006/0012349 A1 | * | 1/2006 | Allen | ........................ 323/265 |

FOREIGN PATENT DOCUMENTS

WO WO02/069839 A1 9/2002

OTHER PUBLICATIONS

Datasheet: "LT1932—Constant-Current DC/DC LED DRiver in Thin SOT", 2001, LInear Technology, pp. 1-16.

* cited by examiner

*Primary Examiner*—Trinh Vo Dinh

(57) ABSTRACT

The power supply (20) for LEDs provides power to a LED light source (10) having a variable number of LEDs wired in series and/or in parallel. The power supply (20) uses current and voltage feedback to adjust power to the LEDs and provides protection to the LED light source (10). A feedback controller (27) compares sensed current and sensed voltage to a reference signal and generates a feedback signal, which is processed by a power factor corrector (124) to adjust the current flow through the transformer supplying current to the LEDs. A LED control switch (24) clamps a peak of the current to the LEDs to provide further protection to the LED light source (10). A short/open detection circuit (30) indicates any detection of a "LED outage" of the LED light source (10).

12 Claims, 4 Drawing Sheets

LEDS DRIVER

CROSS REFERENCE TO RELATED APPLICATION

This application claims the benefit of U.S. provisional application Ser. No. 60/434,550, filed Dec. 19, 2002, which the entire subject matter is incorporated herein by reference.

The technical field of this disclosure is power supplies, particularly, a power supply for LEDs.

Significant advances have been made in the technology of white light emitting diodes (LEDs). White light LEDs are commercially available which generate 10-15 lumens/watt. This is comparable to the performance of incandescent bulbs. In addition, LEDs offer other advantages such as longer operating life, shock/vibration resistance and design flexibility because of their small size. As a result, white light LEDs are replacing traditional incandescent sources for illumination applications such as signage, accenting, and pathway lighting. The white LEDs can be used alone or in conjunction with colored LEDs for a particular effect.

The electrical characteristics of LEDs are such that small changes in the voltage applied to the LED lamp will cause appreciable current changes. In addition, ambient temperature changes will also result in LED current changes by changing the forward drop across the LEDs. Furthermore, the lumen output of LEDs depends on the LED current. The existing electrical power supplies for LED light sources are not designed to precisely regulate the LED current to prevent luminous intensity variations due to input ac voltage variations and ambient temperature. Operation of LED lamps at excessive forward current for a long period can cause unacceptable luminous intensity variations and even catastrophic failure. In addition, current electrical power supplies do not minimize power consumption to maximize energy savings.

It would be desirable to have a power supply for LEDs that would overcome the above disadvantages.

One form of the present invention is a power supply for a LED light source that comprises a power converter and a LED control switch. The power converter operates to provide a regulated power including a LED current and a LED voltage. The LED control switch further operates to control a flow of the LED current through the LED light source. The LED control switch further operates to clamp a peak of the LED current during an initial loading stage of the LED light source. This prevents damage to the LED light source due to a field misapplication.

A second form of the present invention is a power supply for a LED light source further comprising a detection circuit operating to provide a detection signal indicative of an operating condition of the LED light source associated with the LED voltage. The detection signal has a first level representative of a load condition of the LED light source. The detection signal has a second level representative of a short condition or an open condition indicative of the LED light source.

A third form of the present invention is a power supply for a LED light source further comprising a LED current sensor or a LED voltage sensor. Each sensor includes a differential amplifier and means for adjusting a gain of the differential amplifier.

The foregoing forms as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

Figure 1:
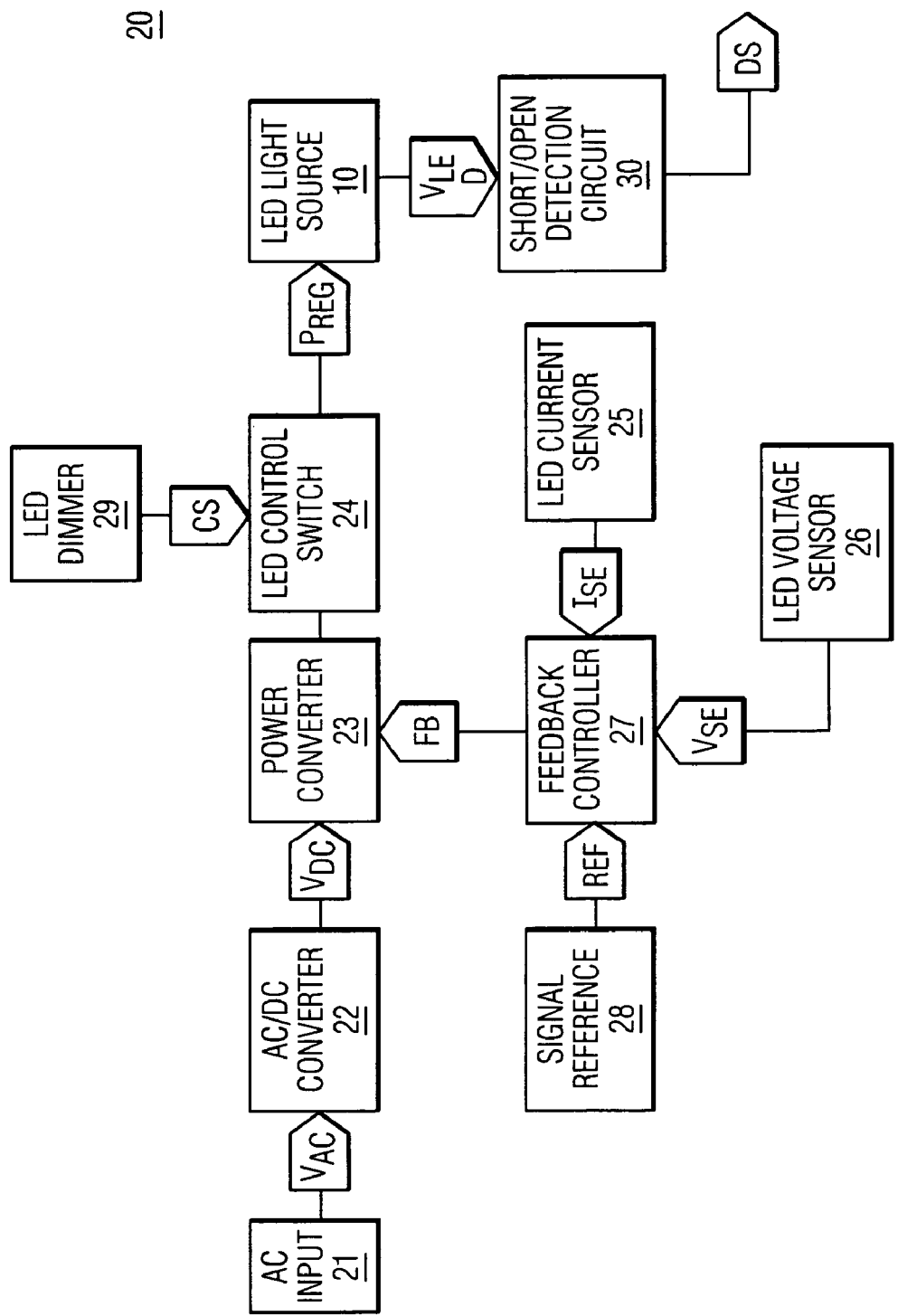
FIG. 1 illustrates a block diagram of a power supply for an LED light source in accordance with the present invention.

FIG. 1 illustrates a block diagram of a power supply 20 for powering an LED light source 10 including a variable number of LEDs wired in series and/or in parallel. A single-phase ac input 21 of power supply 20 provides a voltage $V_{AC}$ to an AC/DC converter 22 of power supply 20 whereby AC/DC converter 22 converts voltage $V_{AC}$ into a voltage $V_{DC}$. AC/DC converter 22 provides voltage $V_{DC}$ to a power converter 23 of power supply 20 whereby power converter 23 generates a regulated power $P_{REG}$ including a LED current and a LED voltage $V_{LED}$.

Power converter 23 provides regulated power $P_{REG}$ to LED light source 10. In operation, LED control switch 24 controls a flow of the LED current through the LED light source 10. A LED current sensor 25 of power supply 20 provides a sensed current $I_{SE}$ indicative of a magnitude of the LED current flowing through LED light source 10. A LED voltage sensor 26 of power supply 20 provides a sensed voltage $V_{SE}$ indicative of a magnitude of the LED voltage $V_{LED}$ applied to LED light source 10. Sensed current $I_{SE}$ and sensed voltage $V_{SE}$ are fed to a feedback controller 27 of power supply 20. A signal reference 28 of power supply 20 provides a reference signal REF to a feedback controller 27, whereby feedback controller 27 provides a feedback signal FB to power converter 23 based on sensed current $I_{SE}$, sensed voltage $V_{SE}$ and reference signal REF.

LED control switch 24 further operates to clamp a peak of LED current flowing through LED light source 10 to thereby protect the LED light source 10 from electrical damage. LED control switch 24 is particularly useful when LED light source 10 transitions from an open operating state to a load operating state (i.e., an initial loading), such as, for example, a connection of LED light source 10 to power supply 20 subsequent to an energizing of power supply 20. An LED dimmer 29 of power supply 20 operates to control a desired dimming of LED light source 10 by providing a control signal CS to LED control switch 24. Control signal CS can be in one of many conventional forms, such as, for example, a pulse width modulation signal ("PWM").

A short/open detection circuit 30 provides a detection signal DS as an indication of a short condition or an open condition of LED light source 10 based on the LED voltage $V_{LED}$ applied to LED light source 10.

The configuration of each component 21-30 of power supply 20 is without limit. Additionally, coupling among the components 21-30 of power supply 20 can be achieved in numerous ways (e.g., electrically, optically, acoustically, and/or magnetically). The number of embodiments of power supply 20 is therefore essentially limitless.

Figure 2:
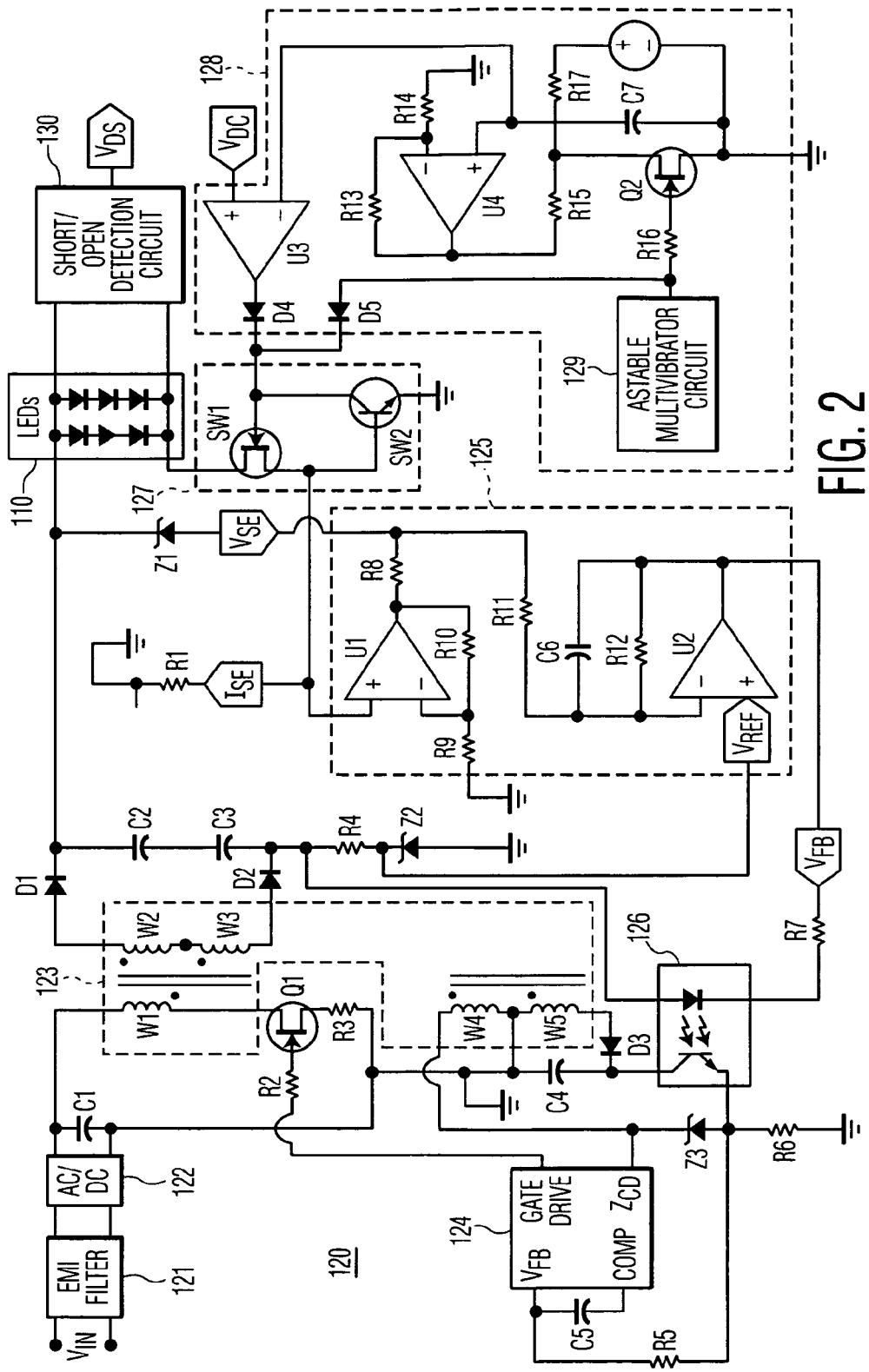
FIG. 2 illustrates a schematic diagram of one embodiment of the FIG. 1 power supply in accordance with the present invention.

FIG. 2 illustrates a schematic diagram of one embodiment 120 of power supply 20 (FIG. 1) for one embodiment 110 of LED light source 10 (FIG. 1) made in accordance with the present invention. Power supply 120 employs a flyback transformer with current feedback through a power factor corrector ("PFC") IC to supply power to LED light source 110. To this end, power supply 120 includes an EMI filter 121, an AC/DC converter ("AC/DC") 122, a transformer 123, a power factor corrector 124, a feedback controller 125, an optocoupler 126, a LED control switch 127, a LED PWM dimmer 128 resistors R1-R7, capacitors C1-C5, diodes D1-D3, zener diodes Z1-Z3 and a MOSFET Q1 as illustrated in FIG. 2.

Voltage is supplied to power supply 120 at $V_{IN}$ to EMI filter 121. The voltage can be an ac input and is typically 50/60 Hertz at 120/230 $V_{RMS}$. EMI filter 121 blocks electromagnetic interference on the input. AC/DC 122 can be a bridge rectifier and converts the ac output of EMI filter 120 to dc. Transformer 123 includes a primary winding W1, W4 and W5, and a plurality of secondary windings W2 and W3. The windings W1/W2 constitute the flyback transformer to power the LED light source 110. The flyback transformer is controlled by PFC 124, which is a power factor corrector integrated circuit, such as model L6561 manufactured by ST Microelectronics, Inc.

The flyback transformer transfers power to LED light source 110 where the LED current and the LED voltage are controlled by feedback control. The forward converter operation of windings W1/W3 charge a capacitor C3 and a reference current signal is generated between a series resistor R4 and a zener Z2. The peak voltage across capacitor C3 depends on the W1/W3 turns ratio. The output dc voltage from flyback operation of windings W1/W2 cannot be used to generate the reference current signal since the output dc voltage across LED light source 110 can have a wide range—from 2.6 Volts dc for one LED lamp to about 32 Volts dc for 8 LEDs in series. The forward converter operation of windings W1/W3 can be used instead. The forward converter operation of the W1/W5 windings can also be used to supply power to the integrated circuits, such as PFC 124.

A sensed LED current $I_{SE}$ flows through resistor R1, which is in series with the LED light source 110 via LED control switch 127. A voltage representative of sensed LED current $I_{SE}$ is applied to a non-inverting input of a comparator U1. A sensed LED voltage $V_{SE}$ is generated by zener diode Z1. Sensed LED current $I_{SE}$ and sensed LED voltage $V_{SE}$ as well as a voltage reference $V_{REF}$ are fed to feedback controller 125, whereby a voltage feedback $V_{FB}$ from feedback controller 125 drives an optocoupler 126 via resistor R7. In generating voltage feedback $V_{FB}$, feedback controller 125 employs a pair of comparators U1 and U2, resistors R8-R12, and a capacitor C6 as illustrated in FIG. 2.

Feedback controller 125 is necessary since optocouplers have a wide range of current transfer ratio (CTR). Feedback controller 125 maintains an accurate voltage feedback $V_{FB}$ to thereby avoid large errors in LED current flowing through LED light source 110. Optocoupler 126 isolates the dc circuit supplying the LED light source 110 from the ac circuit power supply at EMI filter 120, the two circuits being on the opposite sides of the transformer 123.

The output of the optocoupler 126 is connected to PFC 124, which supplies a gate drive signal to MOSFET Q1. Control of MOSFET Q1 adjusts the current flow through winding W1 of transformer 123 to match the LED light source 110 power demand. The internal 2.5 V reference signal and an internal compensation circuit of PFC 124 maintains the voltage drop across a resistor R6 at 2.5V. Although this example uses MOSFET Q1 for adjusting the transformer current, alternate embodiments can use other types of transistors to adjust the current, such as an insulated gate bipolar transistor ("IGBT") or a bipolar transistor. The input to PFC 124 at $Z_{CD}$ provides a reset signal powered from windings W2/W4.

Zener diode Z1 also provides overvoltage protection for LED light source 110. Specifically, zener diode Z1 connects across the output connection to the LED light source 110 and clamps the output voltage to a specified maximum value. The nominal zener operating voltage is selected to be just over the maximum specified output voltage. In case of an output open circuit, the flyback operation of windings W1/W2 of transformer 123 would continue to build the output voltage. The increasing output voltage turns on the zener diode Z1 to thereby increase the amount of feedback to resistor R6 from feedback controller 125 via resistor R7 and optocoupler 126. This limits the gate drive signal to MOSFET Q1, preventing the flyback converter from building the output voltage to the LED light source 110 beyond a specified maximum voltage. Similarly, zener diode Z3 connected from the reset winding W4 to resistor R6 will prevent output overvoltage due to a malfunction of feedback controller 125. In alternate embodiments, either zener diode Z1 or zener diode Z3, or both zener diode Z1 and zener diode Z3 can be omitted depending on the degree of control protection required for a particular application.

LED control switch 127 includes a switch SW1 in the form of a MOSFET and a switch SW2 in the form of a bipolar transistor. Switches SW1 and SW2 can be in other conventional forms, such as, for example, an IGBT. As illustrated, a drain of MOSFET switch SW1 is connected to LED light source 110. A gate of MOSFET switch SW1 is connected to a collector of bipolar switch SW2. A source of MOSFET switch SW1 and a base of bipolar switch SW2 are connected to zener diode Z1, resistor R1, and feedback controller 125. An emitter of bipolar switch SW2 is connected to ground. In operation, switch SW1 is turned on and switch SW2 is turned off when the LED current is below the desired peak. This mode permits a normal operation of the front-end components of power supply 120. Conversely, switch SW1 is turned off and switch SW2 is turned on when the LED current exceeds the desired peak. This limits the peak of the LED current to a safe level whereby damage to LED light source 110 is prevented. As will be appreciated by one having skill in the art, LED control switch 127 is particularly useful upon a connection of LED light source 110 to an energized power supply 120 whereby capacitor C2 discharges stored energy to LED light source 110 with a current having a peak clamped to thereby prevent damage to LED light source 110.

MOSFET switch SW1 can be operated by a conventional gate driver (not shown) or by an illustrated LED PWM dimmer 128.

LED PWM dimmer 128 provides a PWM signal (not shown) to MOSFET switch SW1 in response to an external dim command $V_{DC}$. LED PWM dimmer 128 adjusts the duty cycle of the PWM signal to thereby produce a desired light output from LED light source 110. LED PWM dimmer 128 is particularly useful in producing a precise and temperature sensitive minimum dim level for LED light source 110.

LED PWM dimmer 128 includes a diode D4 and a diode D5 connected to the gate of MOSFET switch SW1. A comparator U3 of LED PWM dimmer 128 is in the form of an operational amplifier having an output connected to diode D4 and a non-inverting input for receiving a dimming command $V_{DC}$. A conventional astable multivibrator circuit 129 of LED PWM dimmer 128 is connected to diode D5. A ramp generator of LED PWM dimmer 128 includes a resistor R16 connected to diode D5 and a gate of transistor Q2 in the form of a MOSFET. Transistor Q2 can be in other forms, such as, for example, an IGBT. The ramp generator further includes an operational amplifier U4. A resistor R15, a resistor R17, a drain of bipolar transistor Q2, a capacitor C7, and an inverting input of comparator U3 are connected to a non-inverting input of operational amplifier U4. Resistor R15 is further connected to an output of operational amplifier U4. A resistor R13 is connected to the output and an inverting input of operational amplifier U4. A resistor R14 is connected to the inverting input of operational amplifier U4 and ground. The source of MOSFET transistor Q2 and capacitor C7 are connected to ground. Resistor R17 is further connected to a DC voltage source.

Figure 3:
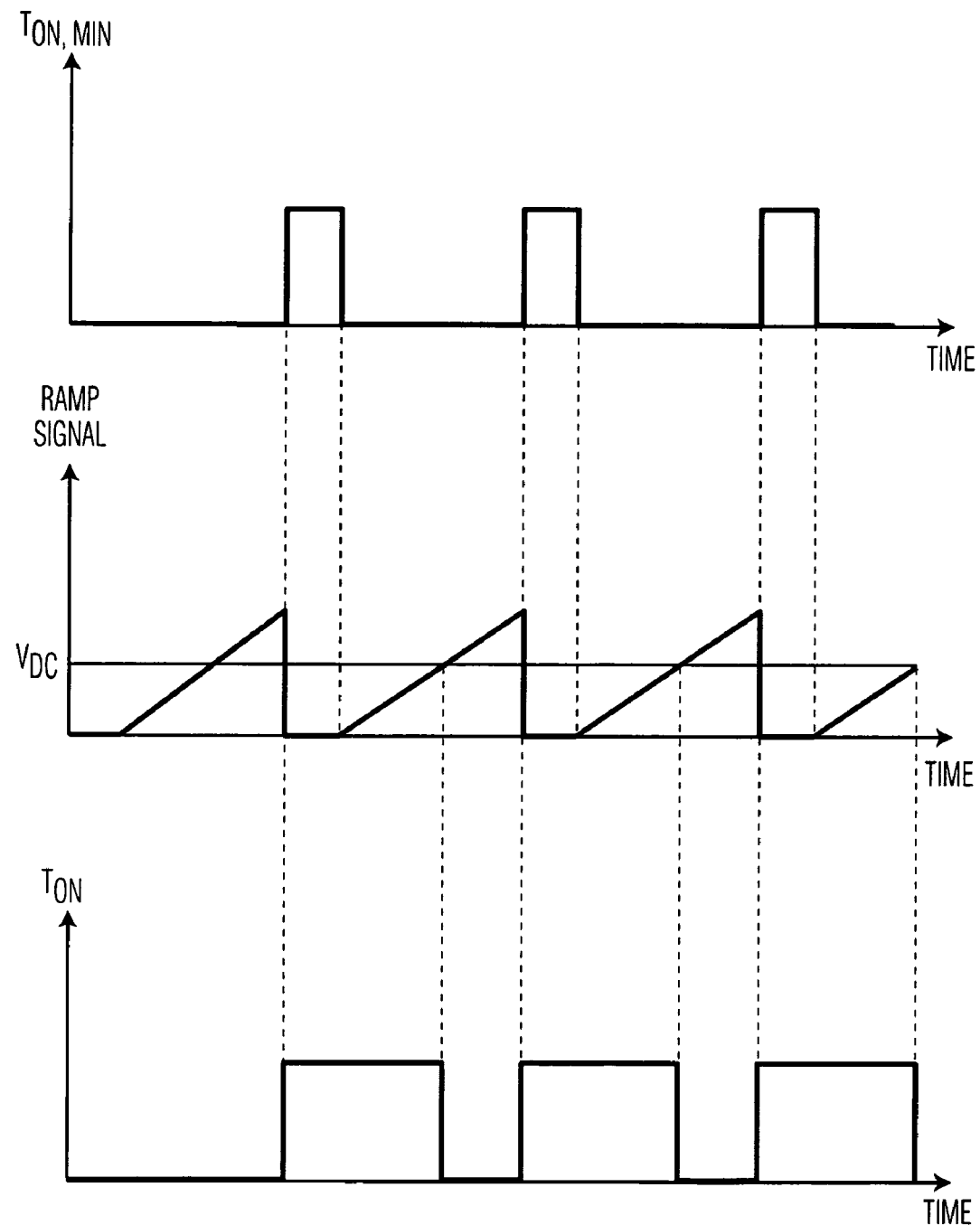
FIG. 3 illustrates a timing diagram of one embodiment of a control circuit in accordance with the present invention.

In operation, LED PWM dimmer 128 achieves a precise and temperature insensitive minimum dim level for LED light source 110. Specifically, astable multivibrator circuit 129 produces a minimum pulse width (e.g., $T_{ON,MIN}$ illustrated in FIG. 3). The duration of the minimum pulse width is a function of a resistance and capacitance of astable multivibrator circuit 129. Thus, the minimum pulse width is accurate and temperature insensitive. The ramp generator produces a ramp signal (e.g., RS illustrated in FIG. 3), which is periodically reset by the minimum pulse width. The ramp signal is supplied to the inverting input of comparator U3 whereby a comparison of the ramp signal and dim command $V_{DC}$ yields a target pulse width at the output of comparator U3 (e.g., $T_{ON}$ illustrated in FIG. 3). The minimum pulse width and the target pulse width are combined to provide the PWM signal at the gate of MOSFET switch SW1. As such, the PWM signal consists of the target pulse width overlapping the minimum pulse width when the dim command $V_{DC}$ exceeds or is equal to the ramp signal. Conversely, the PWM signal exclusively consists of the minimum pulse width when the ramp signal exceeds the voltage dim command $V_{DC}$.

In practice, a suitable range for voltage dim command $V_{DC}$ is 0 to 10 volts.

Short/Open Circuit Detection

Figure 4:
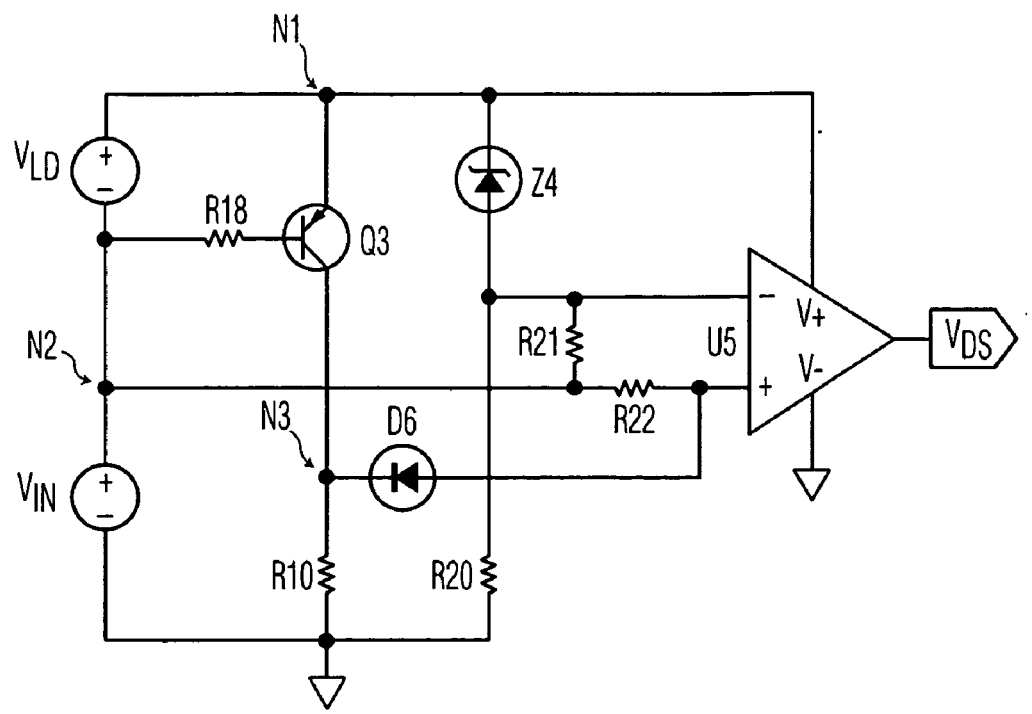
FIG. 4 illustrates a schematic diagram of one embodiment of a short/open detection circuit in accordance with the present invention.

FIG. 4 illustrates one embodiment of short/open detection circuit 130. A LED voltage drop $V_{LD}$ across the LED light source 110 applied between a node N1 and a node N2, and an input voltage $V_{IN}$ is applied between node N2 and a common reference. The LED voltage drop $V_{LD}$ approximates zero (0) volts when LED light source 110 (FIG. 2) is shorted, and approximates the LED voltage $V_{LED}$ of regulated power $P_{REG}$ (FIG. 1) when LED light source 110 is an open circuit. The input voltage $V_{IN}$ is typically in the range of six (6) volts to sixteen (16) volts. A comparator U5 in the form of an operational amplifier provides a detection signal $V_{DS}$ at a high level to indicate a "LED outage" condition of LED light source 110 and at a low level to indicate a normal operation of LED light source 110. The "LED outage" condition is either indicative of a short or open of LED light source 110.

Input voltage $V_{IN}$ in the illustrated embodiment is a dc voltage. A dc-dc type power converter can therefore be used to supply power to LED light source 110 (FIG. 2). In alternative embodiments, detection circuit 130 can be adapted for use in ac to dc type power converters.

An emitter of a transistor Q3 in the form of a bipolar transistor, and a zener diode Z4 are also connected to node N1. Transistor Q3 can be in other conventional forms, such as, for example, an IGBT. A resistor R18, a resistor R21, and a resistor R22 are also connected to node N2. A base of bipolar transistor Q3 is connected to resistor R18. Zener diode Z4, a resistor R20 and resistor R21 are connected to an inverting input of comparator U5. A collector of bipolar transistor Q3, a diode D6, and a resistor R19 are connected to a node N3. Resistor R19 and resistor R20 are further connected to the common reference. Diode D6 and resistor R22 are connected to a non-inverting input of comparator U5.

For a normal operation of LED light source 110, the LED voltage drop $V_{LD}$ is greater than the base-emitter junction voltage of transistor Q3 whereby transistor Q3 is on, diode D6 is in a non-conductive state, and the voltage at the collector of transistor Q3 exceeds the input voltage $V_{IN}$. As a result, the input voltage $V_{IN}$ is applied to the inverting input of comparator U3. The conducting voltage of zener diode Z4 is chosen to be above the LED voltage drop $V_{LD}$ and therefore zener diode Z4 is in a non-conductive state. As a result, a voltage applied to the non-inverting input of comparator U2 will equate the input voltage $V_{IN}$ reduced by a voltage divider factor established by resistor R20 and resistor R21. The output of comparator U5 will be low (e.g., close to ground) since the voltage applied to the inverting input exceeds the voltage applied to the non-inverting input.

For an open array condition of LED light source 110, the LED voltage drop $V_{LD}$ approximates the LED voltage $V_{LED}$ of regulated power $P_{REG}$, which is chosen to be higher than the voltage of zener diode Z4. The LED voltage drop $V_{LD}$ is greater than the base-emitter junction voltage of transistor Q3 whereby transistor Q3 is on and the voltage at the collector transistor Q3 exceeds the input voltage $V_{IN}$. As a result, the input voltage $V_{IN}$ is applied to the inverting input of comparator U3. The conducting voltage of zener diode Z4 is lower than the LED voltage drop $V_{LD}$ and zener diode Z4 is therefore in a conductive state. As a result, a voltage applied to the non-inverting input of comparator U5 will equate a summation of the input voltage $V_{IN}$ and the LED voltage drop $V_{LD}$ minus the conducting voltage of diode D6. The output of comparator U5 will be high (e.g., close to the input voltage $V_{IN}$) since the voltage applied to the non-inverting input exceeds the voltage applied to the inverting input.

For a short array condition of LED light source 110, the LED voltage drop $V_{LD}$ approximates zero (0) volts. The LED voltage drop $V_{LD}$ is therefore less than the base-emitter junction voltage of transistor Q3 whereby transistor Q3 is off, the voltage at the collector transistor is pulled down by resistor R19 and diode D6 is conducting. As a result, a voltage applied to the inverting input of comparator U5 will equate the input voltage $V_{IN}$ reduced by a voltage divider factor established by resistor R19 and resistor R22. The conducting voltage of zener diode Z4 exceeds the LED voltage drop $V_{LD}$ and zener diode Z4 is therefore in a non-conductive state. The output of comparator U5 will be high (e.g., close to the input voltage $V_{IN}$) since the voltage applied to the non-inverting input exceeds the voltage applied to the inverting input.

In an alternate embodiment, an additional zener diode or a voltage reference can be inserted in the emitter path of transistor Q3 to detect a voltage level other than less that one base-emitter junction of transistor Q3.

Figure 5:
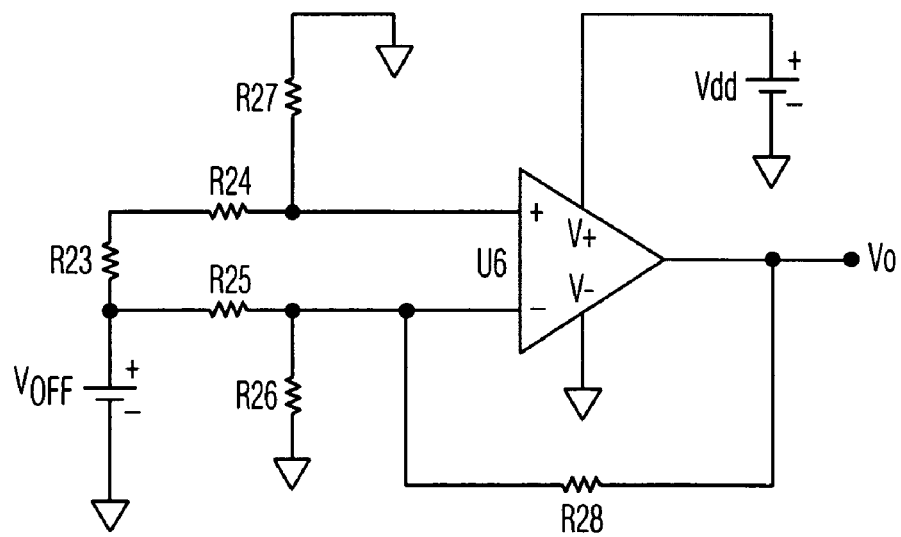
FIG. 5 illustrates a schematic diagram of one embodiment of a differential amplification circuit in accordance with the present invention.

FIG. 5 illustrates a differential amplification circuit having a voltage output $V_O$ that can be employed in LED current sensor 25 (FIG. 1) or LED current sensor 26 (FIG. 1). A resistor R23 and a resistor R25 are connected to an offset voltage source $V_{OFF}$. Resistor R25, a resistor R26, and a resistor R28 are connected to an inverting input of an operational amplifier U6. A resistor R24 and a resistor R27 are connected to a non-inverting input of operational amplifier U6. Resistor R23 and resistor R24 are connected. Resistor R28 is further connected to an output of operational amplifier U6.

In operation, the voltages applied to the inputs of the operational amplifier U6 are lower than the supply voltage $V_{dd}$ irrespective of the size of resistor R23. In one embodiment, resistors R25 and R26 are chosen to apply half of the offset voltage $V_{OFF}$ to the inverting input of operational amplifier U6, and resistors R24 and R27 are chosen to obtain a proper common mode rejection (e.g., resistor R28 equaling a parallel combination of resistor R26 and R28). As a result, the gain of operational amplifier U6 can be adjusted as desired.

It is important to note that FIGS. 2-5 illustrates specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A power supply for an LED light source, said power supply comprising:
    a power converter operable to provide a regulated power including a LED current and a LED voltage;
    a LED control switch operable to control a flow of the LED current through the LED light source
        wherein said LED control switch is further operable to clamp a peak of the LED current during an initial loading stage of the LED light source;
    a switch operable to establish a current path from the LED light source to said power converter when the LED current is below the peak threshold, said switch further operable to eradicate the current path when the LED current is above the peak threshold
    an LED PWM dimmer operable to provide a pulse width modulation signal to said LED control switch in response to an external dim command,
        wherein said pulse width modulation signal has a target pulse width in response to the dim command exceeding a ramp signal, and
        wherein said pulse width modulation signal has a minimum pulse width in response to the ramp signal exceeding the dim command.

2. The power supply of claim 1, wherein said LED PWM dimmer includes:
    an astable multivibrator circuit operable to establish the minimum pulse width in a precise and temperature insensitive manner.

3. The power supply claim 1, wherein said LED PWM dimmer includes:
    a comparator operable to establish the target pulse width in response to a reception of the dim command and the ramp signal.

4. The power supply of claim 3, wherein said LED PWM dimmer further includes:
    a ramp generator operable to provide the ramp signal to said comparator indicative of the minimum pulse width.

5. The power supply of claim 4, wherein said LED PWM dimmer further includes:
    an astable multivibrator circuit operable to establish the minimum pulse width in a precise and temperature insensitive manner.

6. A power supply for an LED light source, said power supply comprising:
    a power converter operable to provide a regulated power including a LED current and a LED voltage;
    an LED control switch operable to control a flow of the LED current through the LED light source; and
    a detection circuit operable to provide a detection signal indicative of an operating condition of the LED light source associated with the LED voltage,
    wherein said LED control switch is further operable to clamp a peak of the LED current during an initial loading stage of the LED light source,
    wherein the detection signal has a first level representative of a load condition of the LED light source, and
    wherein the detection signal has a second level representative of either a short condition or an open condition of the LED light source.

7. The power supply of claim 6, wherein the load operating condition indicates a magnitude of a LED voltage drop across the LED light source is between zero volts and the LED voltage.

8. The power supply of claim 6, wherein the short operating condition indicates a magnitude of a LED voltage drop across the LED light source approximates zero volts.

9. The power supply of claim 6, wherein the open operating condition indicates a magnitude of a LED voltage drop across the LED light source approximates the LED voltage.

10. A power supply for an LED light source, said power supply comprising:
    a power converter operable to provide a regulated power including a LED current and a LED voltage;
    an LED control switch operable to control a flow of the LED current through the LED light source; and
    a current sensor operable to sense the LED current flowing through the LED light source, said current sensor including
    an differential amplifier, and
    means for adjusting a gain of said differential amplifier,
    wherein said LED control switch is further operable to clamp a peak of the LED current during an initial loading stage of the LED light source.

11. A power supply for an LED light source, said power supply comprising:
    a power converter operable to provide a regulated power including a LED current and a LED voltage;
    an LED control switch operable to control a flow of the LED current through the LED light source; and
    a voltage sensor operable to sense the LED voltage applied to the LED light source, said voltage sensor including
    an differential amplifier, and
    means for adjusting a gain of said differential amplifier, wherein said LED control switch is further operable to clamp a peak of the LED current during an initial loading stage of the LED light source.

12. A method of operating an LED light source, said method comprising:
   providing a regulated power to the LED light source, the regulated power including an LED current and an LED voltage;
   controlling a flow of the LED current through the LED light source;
   clamping a peak of the LED current during an initial loading stage of the LED light source; and
   generating a detection signal indicative of an operating condition of the LED light source associated with the LED voltage,
   wherein the detection signal has a first level representative of a normal operating condition of the LED light source, and wherein the detection signal has a second level representative of either a short operating condition or an open operating condition of the LED light source.

* * * * *